Aug. 16, 1966   W. L. CARLSON, JR   3,266,235
CONTROL APPARATUS
Filed Nov. 2, 1964                    2 Sheets-Sheet 1

INVENTOR
WILLIAM L. CARLSON JR.
BY
*Alan M. Staubly*
ATTORNEY

INVENTOR.
WILLIAM L. CARLSON JR.
BY
ATTORNEY

United States Patent Office 3,266,235
Patented August 16, 1966

3,266,235
CONTROL APPARATUS
William L. Carlson, Jr., Bloomington, Minn., assignor to Honeywell Inc., a corporation of Delaware
Filed Nov. 2, 1964, Ser. No. 408,146
12 Claims. (Cl. 60—23)

This invention relates to control apparatus and more particularly to an improved thermal actuator for controlling the operation of valves, dampers, switches or the like. Specifically, my invention relates to an improved construction for a thermal actuator of the type having a thermally expansible material enclosed within a pressure chamber and acting upon an output member so that by heating the expansible material the output member is driven to perform a control function.

It is well known that many materials such as various types of waxes expand substantially when heated. It is also known that an actuator capable of providing large forces can be constructed by enclosing such a material within a housing with the expansible material acting upon an output member. By selectively heating the expansible material large pressures can be produced which in turn drive the output member outwardly from the chamber with a large force. By so doing, a very small actuator can provide relatively large and relatively easily controlled forces.

Many thermal actuators of the type generally described above have been proposed in the past and a substantial number are available commercially today. However it has been found that one major problem exists in actuators of this type. When the expansible material is heated in the chamber very high pressures occur therein. For example, in a very small actuator, pressures exceeding 9,000 p.s.i. have been found to exist. With the existence of such high pressure within the chamber a great deal of difficulty has been encountered in sealing the chamber so as to retain the expansible material therein and yet provide a means for effectively driving the output member outward by the expanding material. One method of accomplishing this seal, which has been suggested, is the use of a flexible diaphragm to seal the chamber with the diaphragm in turn engaging the output member. However, due to the high temperatures and pressures encountered along with the severe stressing of the diaphragm as the actuator is cycled, such seals have in many instances proven unsuccessful. Another arrangement which has been used in the past in the use of an extruding rubber plug. In many instances this seal, although relatively expensive, has not been altogether satisfactory.

A sealing problem has also occured when it was desired to place the heater for expansible material within the chamber itself. In such cases it was necessary to bring in a pair of electrical lead wires and sealing of these leads has proven to be a rather substantial problem in many instances. Obviously one method of avoiding this difficulty is simply to wrap the heater on the outside of the actuator and thereby eliminate the necessity of bringing lead wires into the chamber. This has been done in many actuators but the efficiency of the device is greatly reduced by so doing due to the fact that a great deal of the energy supplied to the heater is lost due to heat dissipating to the surrounding atmosphere. For the same reason actuators of this type have been very slow acting and consequently unsatisfactory for applications requiring an actuator with rapid time response. Thus it is desirable, in order to provide an efficient actuator, that the heater be placed within the pressure chamber and actually embedded within the expansible material. In the past, although it has been possible to obtain terminal disks or headers commercially, which had terminals extending therethrough and hermetically sealed therein, it has been difficult to seal this header or terminal disk with respect to the actuator housing so that the high pressures occurring in the pressure chamber did not cause leakage of the expansible material around the header member.

By the present invention I have provided a thermal actuator which substantially overcomes the problems discussed above. I have provided a sealing arrangement between the pressure chamber and the output member wherein the high pressures of the expansible material can efficiently drive the output member outwardly from the chamber in order to provide a control function and yet the sealing arrangement prevents leakage of the expansible material even after prolonged cycling operations of the actuator. In addition, the seal is relatively uneffected by the prolonged effect of the high pressures and temperatures which occur within the pressure chamber.

I accomplish this improved feature by providing an elongated opening extending outward from the pressure chamber. In this opening I mount an elongated cup-shaped member formed of a somewhat flexible or deformable material such as polytetrafluoroethylene which is resistant to relatively high temperatures and pressures. This cup-shaped member is tightly fitted into the elongated opening with the hollow portion of the cup extending towards the pressure chamber so that as the pressure in the chamber increases the walls of the cup-shaped member are urged ever more tightly into engagement with the walls of the housing surrounding the elongated opening. I have found that by making the axial length of this cup-shaped member at least as great as, and preferably greater than, the maximum stroke of the member in the elongated opening, the problem of leakage of the thermally expansible material can be greatly reduced. Also mounted in the elongated opening and abutting the closed end of the cup-shaped member, is an output member which preferably takes the form of a shaft. This output member is formed somewhat smaller in cross-section than the cross-sectional dimension of the elongated opening and is surrounded by two bearing members which engage the walls of the elongated opening so that the output member never comes into contact with these walls. Hence the surface surrounding the elongated opening is not damaged due to metal to metal contact with the output member. The bearing members intermediate the output member and the housing are preferably formed of a material such as polytetrafluoroethylene which is somewhat resilient and has some self-lubricating characteristics and has good wear characteristics even when subjected to relatively high pressures. This material is preferably glass-filled to render it non-extrudable.

By my invention I have also overcome the problem of sealing the terminal disk or header by which the electrical connections for an internal heater are made. This I accomplish by providing an arrangement wherein the header is preloaded so as to be slightly deformed by a member urging it into engagement with the housing, the preloading being such that the header is tightly pressed against the housing and so that as the pressure in the chamber builds up, the sealing force between the header and the housing is increased to provide an even greater seal therebetween.

Therefore an object of my invention is to provide an improved thermal actuator of the type having a pressure chamber filled with a thermally expansible material and a movable output member driven by the expansion of the expansible material.

Another object of my invention is to provide, in a thermal actuator of the type described above, an improved seal between the pressure chamber and the output member to prevent leakage of the thermally expansible material from the chamber.

A further object of my invention is to provide, in an actuator of the type described above, the improved combination of a cooperating sealing member and output member constructed and arranged to provide an effective seal over prolonged periods and many cycles of operation but wherein the arrangement provides for efficient operation of the output member upon heating of the expansible material.

Still a further object of my invention is to provide an improved structure for bringing electrical leads into the pressure chamber of a thermal actuator of the type having an internal electric heater embedded in an expansible material in the pressure chamber.

A further object of my invention is to provide apparatus for preloading a generally flat sealing member in such a manner as to accomplish a tight seal between the member and a housing member and so that, upon in increase in the pressure in the chamber which the member is to seal, the pressure tends to increase the sealing force between the member and the housing.

These and other objects will become apparent upon reading the following description of a preferred embodiment of my invention with reference to the various figures in the drawing wherein.

Figure 5:
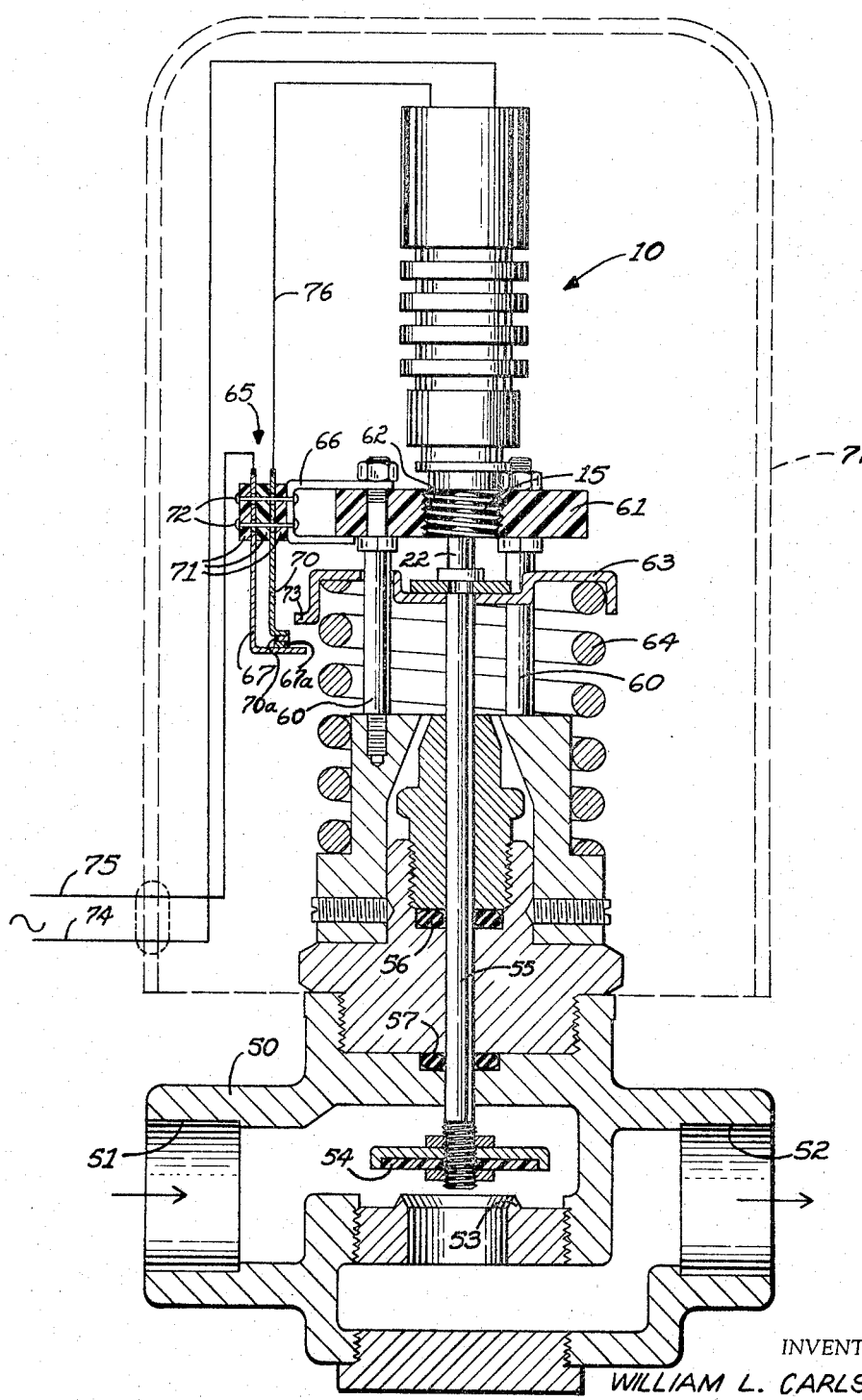

FIGURE 5 discloses an actuator constructed according to my invention utilized as an operator for a normally open water valve.

Figure 1:
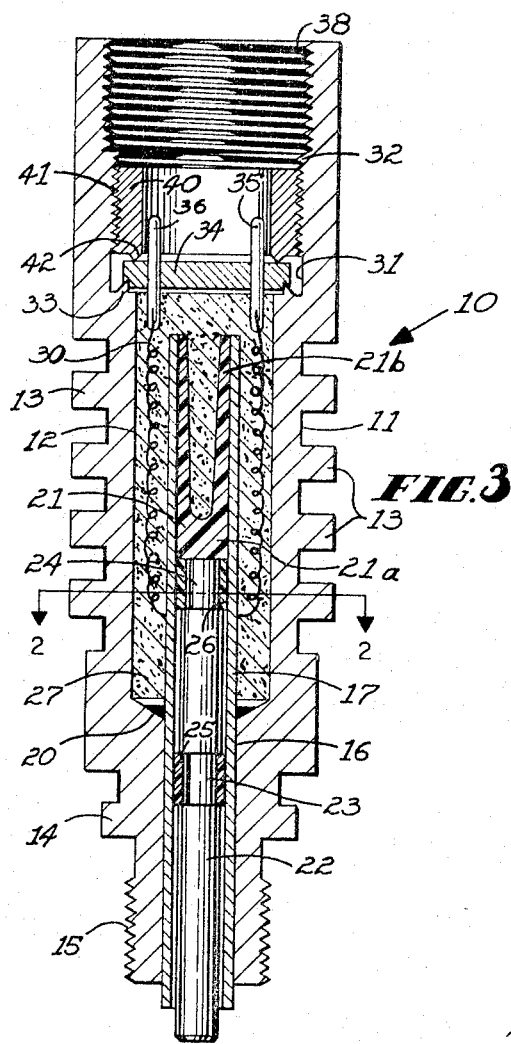
FIGURE 1 is a longitudinal cross-sectional view of a thtermal actuator constructed according to the preferred embodiment of my invention, the view being taken generally along line 1—1 of FIGURE 2.
Figure 2:
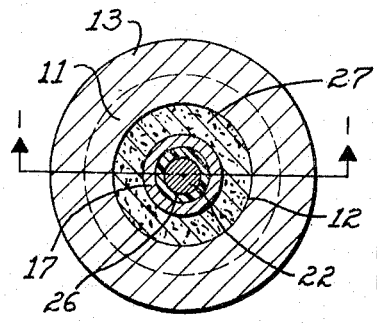
FIGURE 2 is a transverse cross-sectional view taken along line 2—2 of FIGURE 1.

Referring first to FIGURES 1 and 2, reference numeral 10 refers generally to a thermal actuator having a housing member 11 which is generally cylindrical in shape and has a cylindrical pressure chamber 12 formed therein. Housing member 11 may have a plurality of radially extending cooling fins 13 extending from the housing in the area of the pressure chamber 12. Housing 11 may also have an annular flange 14 adjacent the lower end thereof by which it may be clamped to a device which it is to operate and further may have an externally threaded portion 15 by which it may be attached to a device such as a valve which it is to operate.

Extending generally co-axially through the housing 11 and into the pressure chamber 12 is a cylindrical opening 16 which may be said to form an output passage or opening through the housing. In the preferred form of the actuator, as disclosed in FIGURE 1, an elongated tube 17 is tightly fitted into the passage 16 with a substantial portion extending into the pressure chamber 12. The tube 17 is sealed with respect to housing 11 as by brazing 20 which forms an annular connection inside the pressure chamber between the tube and the housing itself.

Within the tube 17, which preferably has a relatively finely finished cylindrical interior surface, is mounted a cup-shaped sealing member 21. Cup-shaped member 21 is formed of a flexible or deformable material such as polytetrafluoroethylene and is tightly fitted within the smooth cylindrical opening in the tube 17. Member 21 has a base portion 21a and a relatively thin annular wall portion 21b. The member is mounted in the tube 17 with the base portion extending outwardly in the tube and the hollow cup portion opening towards the pressure chamber.

Also mounted in tube 17, outwardly from the cup-shaped member 21, is an output member 22 which preferably is a cylindrical shaft. Member 22 has a diameter somewhat smaller than the cross-sectional diameter of the opening in tube 17 and also has two spaced areas 23 and 24 each having an even smaller diameter. Fitted in these grooves are a pair of annular bearing members 25 and 26 respectively, these bearing members each having an inner diameter sufficiently small so that they fit snugly about the reduced diameter portions of the shaft and an outer diameter so that they fit snugly into the opening in the tube 17. The bearing members 25 and 26 are preferably formed of a material such as polytetrafluroethylene which has good wear characteristics and self-lubricating properties even under conditions of relatively high temperature. These bearing members also are relatively resilient so that the member 25 can be stretched over the enlarged diameter portions of shaft 22 and into the groove 23. Preferably the bearing material is glass-filled to render it non-extruding. Bearing members 25 and 26 are thus intermediate the shaft 22 and the interior walls of tube 17 and thus maintain the output shaft 22 in spaced relationship with the walls of the tube.

Substantially filling the pressure chamber 12 is a thermally expansible material 27 the composition of which forms no part of the present invention. However, by way of example, the material 27 preferably is a wax which may be a natural wax such as paraffin, in some instances beeswax, a mixture of natural waxes, or may be a synthetic wax. It is only essential that the material have a relatively high and predictable expansion characteristic upon heating. Embedded in the expansible material 27 is an electrically energizable heater 30 extending into the chamber from the upper end thereof, as seen in FIGURE 1, and extending a substantial distance into the chamber, in the thermally expansible material so that upon heating of the heater the heat energy is efficiently transferred to the expansible material and causes expansion thereof.

Figure 3:
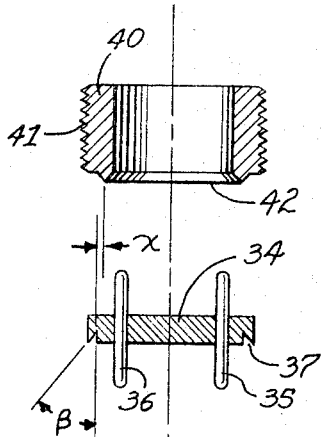
FIGURE 3 is a fragmentary exploded view disclosing the components providing an improved sealing arrangement between the actuator housing and a terminal carrying member.

At the upper end of chamber 12, housing 11 has an increased diameter, axially extending, cylindrical opening 31 in and about this opening the walls of the housing are threaded at least a portion of their axial length, as at 32. About the mouth of the pressure chamber 12, that is the position where the chamber opens into the enlarged diameter area 31, is formed, in a plane transverse to the axis of the actuator, an annular knife edge surface 33, the two intersecting walls of which form an angle α which may be, for example, of approximately 45°. (In this connection reference should be had to FIGURE 3 of the drawing.) Cooperable with this knife edge 33 is a header or terminal disk 34 which is formed of an electrically non-conductive material and which has a pair of electrically conductive terminals 35 and 36 extending therethrough and hermetically sealed wth respect thereto. Formed in the underside of header member 34 is a generally V-shaped annular groove 37 the two sides of which form an angle β which is preferably somewhat smaller than the angle α, for example 35° or 40°. The annular groove 37 has a diameter substantially equal to the diameter of the annular knife edge surface 33 and, when the device is assembled, the header 34 is urged down onto the housing 11 so that the annular knife 33 is forced into the groove 37. The terminals 35 and 36 are electrically connected to opposite ends of the electric heater 30 thus providing a means for applying power to the heater. Housing 12 may be provided with an additional internally threaded portion 38 so that an electrical conduit may be attached thereto if high voltages are used.

Adapted to be threaded into the internally threaded portion 32 of the housing member 11 is an annular member 40 having an external threaded portion 41. On the underside of the member 40 is formed an annular knife edge 42 adapted to engage the upper surface of the header 34 when the unit is assembled but having a diameter somewhat less than the diameter of the knife edge 33. The difference in these diameters is designated "x" in FIGURE 3. As can be seen by again referring to FIGURE 1, the member is threaded into the threaded portion 32 and when tightened down the knife edge 42 engages header 34 and urges it into engagement with the housing 11 so that knife edge 33 is urged into the annular groove 37 in header 34.

Figure 4:
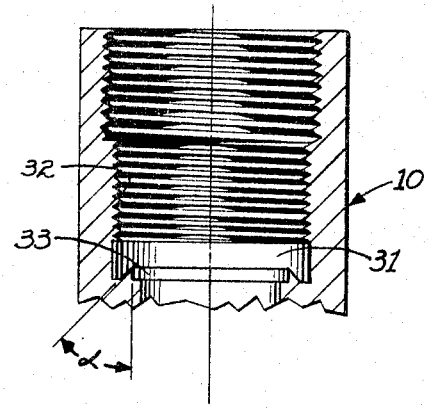
FIGURE 4 is an enlarged schematic view disclosing, in somewhat exaggerated form, the assembled components of FIGURE 3 and the forces acting thereon in operation of the actuator.
Figure 4:
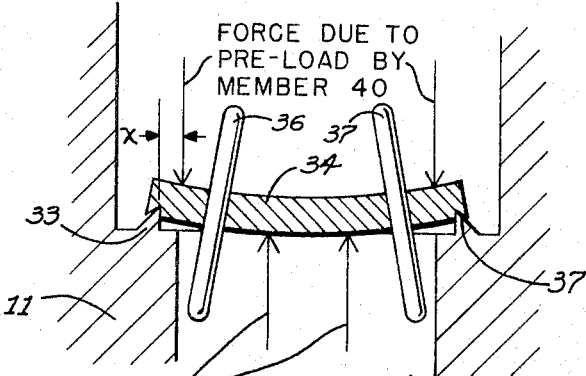

This structure provides an improved sealing arrangement between the header and the housing. The manner in which this takes place can best be seen by referring to FIGURE 4 wherein the assembled structure is shown in an enlarged and somewhat exaggerated schematic form. When the member 40 is tightened down against the header 34 the force therefrom is exerted against header 34 by the knife edge 42, this force urging the header 34 in a downwardly direction as seen in FIGURE 4. The reactive force exerted against header 34 by housing 11 acts through the knife edge 33 of housing 11. Due to the differences in diameters between the knife edges 42 and 33, the header member 34 tends to be stressed so as to bow slightly inward toward the pressure chamber. This accomplishes a preloading on the member which, when tightened down sufficiently to accomplish this preloading, has been so pressed against housing member 11 that the knife edge 33 is forced into the somewhat smaller annular opening 37. When the pressure in chamber 12 increases it acts upon the underside of the header 34 in opposition to the force exerted against it by member 40. The force exerted by the expansible material attempts to cause the header to bow in the opposite direction and consequently to pivot about the knife edge 42 of member 40. This in turn tends to force the outer edge of header 34, containing annular groove 37, more tightly into engagement with knife edge 33. Thus as the pressure in chamber 12 increases the sealing force between the header 34 and the housing 11 increases to provide an even better seal to prevent the expansible material from leaking from the chamber.

As the pressure in the chamber 12 builds up due to the expansion of expansible material 27 therein when the heater 30 is energized, it acts upon the inner walls of sealing member 21 pressing them even more tightly into engagement with the inner walls of tube 17. At the same time the pressure urges sealing member 21 outwardly from the pressure chamber and since base portion 21a of the sealing member abuts the end of the output shaft 22, movement of the sealing member causes outward movement of the output member 22 also. As will be better seen in connection with FIGURE 5 which will be described shortly hereinafter, when the actuator 10 is applied to a device which it is to operate, a relatively strong yieldable member such as a spring must be used to constantly urge the output shaft 22 and consequently the sealing member 21 inwardly in tube 17 toward the pressure chamber. Thus whenever heater 30 is energized and the members 21 and 22 driven outwardly, they are driven in opposition to the biasing force.

Also some means must be provided which limits the axial movement of members 21 and 22 with respect to the housing. For example, the actuator may be so constructed as to be self-limiting or may be limited by an end switch arrangement. An important part of my invention is in constructing the sealing member 21 so as to have an axial length which is at least as great as, and preferably slightly greater than, the maximum stroke or axial displacement which it ever has within the tube 17. By so doing the pressure within the chamber is never able to force the expansible material into pores in the inner wall of tube 17, when the sealing member 21 is moved outwardly from the chamber, in a position so that when the member 21 is again moved back to its innermost position the pores containing the expansible material will be beyond the outer end of the member 21. Obviously when the member 21 is longer than its maximum stroke within the tube 17 such a condition never occurs. If such a condition should occur, when the member 21 moves back in toward the chamber so that the pores filled with the expansible material are outside of the outermost end of member 21 and consequently exposed to only atmospheric pressure, the material will be allowed to expand and consequently, at least in part, flow out of the pores and eventually result in leakage. This situation, as noted above, is prevented in the present invention.

While the actuator of the present invention may find use in a variety of applications, such as valves, dampers, switches and the like, it is particularly useful in controlling valves. Therefore FIGURE 5 discloses the actuator 10 mounted upon a water valve for operation thereof. Since the structure of the valve per se forms no part of the present invention it will be described very briefly with particular attention to the mounting and operation of the actuator 10 rather than the detail of the valve. Briefly, the valve comprises a valve body 50 which has inlet and outlet ports 51 and 52 respectively separated by a valve seat 53. Cooperable with valve seat 53 is a valve closure member 54 carried by a valve stem 55 which extends upward from the valve body and may be sealed with respect thereto as by a pair of O-rings 56 and 57.

Mounted on the valve housing member by appropriate means such as a pluarilty of elongated bolts 60 is a member 61 which is internally threaded at 62 to receive the threaded portion 15 of the actuator 10 and in this manner the actuator 10 is mounted on the valve housing. Mounted at the upper end of the valve stem 55 is a cup-shaped member 63 having a plurality of apertures therein through which the bolts 60 extend. The member 63 is mounted in inverted fashion and acts as a spring retainer against which one end of a relatively strong spring 64 bears. The other end of this spring 64 bears against a shoulder on the valve housing. Thus the spring tends to urge the inverted cup-shaped member upward and maintains it in engagement with the outer end of the output shaft 22 of actuator 10. In this manner the output shaft 22 is constantly urged towards the pressure chamber as was discussed previously in connection with the description of the details of the actuator.

The valve may also have mounted thereon an end switch arrangement for controlling the energization of the heater for actuator 10. For example, FIGURE 5 discloses a switch construction 65 carried by a bracket member 66 which is fastened to the mounting member 61 by one of the bolts 60. Switch 65 includes two conductive members 67 and 70 which are generally L-shaped and mounted in spaced parallel relationship by a plurality of insulative members 71 which are mounted on the bracket 66 by appropriate means such as rivets 72. The blade members 67 and 70, as noted previously, are generally L-shaped members and have a vertical leg and a horizontal leg. The horizontal leg of blade 67 is below and generally parallel to the horizontal leg of blade 70 and is somewhat longer. These two members carry a pair of mating contacts 67a and 70a respectively and the members are so constructed that these two contacts are closed in their normal position. The cup-shaped member 63 has an extending tab 73 on the side adjacent the end switch and this tab and the blades 67 and 70 are so arranged that when the valve is in its normal position, that is when the actuator 10 is not energized and the member 63 is in its uppermost position, tab 73 does not interfere with the blades 67 and 70 of the end switch. However, when actuator 10 is energized and drives member 63 as well as the valve stem 55 downwardly, tab 73 engages the free end of blade 67 and moves this end downward to separate the contacts 67a and 70a at a time when the valve closure member 54 has fully seated on its seat 53. Opening of the contacts 67a and 70a interrupts an electrical circuit to the heater for actuator 10. For example, the electrical wiring for the actuator is shown schematically in FIGURE 5 and in this case two conductors 74 and 75 may be provided and adapted to connect the actuator to a source of electrical power. One of these conductors, for example conductor 75, may be connected to the switch blade 67 and a further conductor 76 extends from blade 70 to the actuator. Conductor 74 runs directly to the actuator.

When the actuator is in its retracted position as shown in FIGURE 5 a circuit is completed through the contacts 67a and 70a so that the actuator may be energized if the conductors 74 and 75 are connected to a source of power. However, as the actuator moves the valve closure member and member 63 downward to a valve closed position, tab 73 separates the contacts 67a and 70a and interrupts the circuit to the heater. Thus the switch 65 acts as an end switch which may be positioned to determine the maximum stroke of the actuator. The valve actuating mechanism and the end switch 65 may be enclosed by a cover 77 which is disclosed in phantom outline in FIGURE 5 if desired.

From the foregoing it can be seen that I have provided an improved thermal actuator having an improved seal between the pressure chamber and the output shaft and also an improved sealing arrangement between the pressure chamber and the header through which the electrical conductors for the actuator heater are passed into the pressure chamber. Obviously many modifications to the structure described can be made without departing from the spirit of my invention. For example, it is not essential that the tubular member 17 be used in the actuator. The sealing member 21 and output shaft 22 may be placed directly in the cylindrical opening 16 by making the lower end of the actuator considerably longer and making the opening 16 of a somewhat smaller diameter or else enlarging the diameter of the sealing member and the output shaft and its bearings. Since bearing members 25 and 26 are spaced to have a total length approximately equal to the axial length of sealing member 21 and since these members have a stroke which may be as great as the length of member 21, this cylinder must be approximately three times as long as the member 21 at a minimum. Since it is very important, for many applications, that the size of the actuator be kept to a minimum, I have found it desirable in my preferred embodiment to have the tubular member 17 extend into the pressure chamber a substantial distance so that it provides the necessary axial length for the cylinder in which members 21 and 22 are mounted but reduces the overall length of the actuator.

It will also be understood that the sealing arrangement between the pressure chamber and the output shaft which I have described herein will be applicable to a thermal actuator of the general type described whether the heater is located within the pressure chamber or externally thereof. Further it will be understood that the sealing arrangement described herein with regard to the terminal disk or header may find application in devices other than the thermal actuator described.

It should be understood that the valve disclosed in FIGURE 5 is shown by way of example only as one application for my improved actuator. The actuator is clearly not limited in its use to such a valve but will find application in many other areas as well.

Since these and many other modifications will become apparent to those skilled in the art in view of my disclosure herein, it is intended that this disclosure be by way of example only and not by way of limitation. Therefore it is to be understood that my invention is to be limited only by the scope of the appended claims.

I claim:

1. A thermal actuator comprising: a body member having therein a pressure chamber and an elongated passage communicating with said pressure chamber; a thermally expansible material in said chamber; and a generally cup-shaped sealing and force transmitting member having a closed end and an open end and a laterally deformable wall portion, said member being connected to said body member only by being tightly fitted into said elongated passage in sliding engagement with the walls of said body member surrounding said passage and with the open end of the member in communication with said pressure chamber so that expansion of the material in said chamber is effective to drive said member outwardly from the chamber and to laterally deform the wall portion of said member to force it more tightly into engagement with the walls surrounding said elongated passage, said sealing and force transmitting member being characterized in that it has an axial length greater than its stroke in said passage.

2. A thermal actuator comprising: a body member having therein a pressure chamber and an elongated passage communicating with said pressure chamber; a thermally expansible material in said chamber; a cup-shaped, sealing and force transmitting member having a laterally deformable wall portion, said member being connected to said body member only by being tightly fitted into said elongated passage in sliding engagement with the walls of said body member surrounding said passage and with the open end of the member in communication with said pressure chamber so that expansion of the material in said chamber is effective to drive said member outwardly from the chamber to a distance defining the stroke of said member in the passage and to laterally deform the wall portion of said member to force it more tightly into engagement with the walls surrounding said elongated passage to improve the seal therebetween, said sealing and force transmitting member being further characterized in that the axial length thereof is greater than its stroke in said passage; an output shaft movably mounted in said passage; and yieldable means urging said output shaft into abutment with said cup-shaped member and thereby urging said cup-shaped member toward said pressure chamber.

3. In a thermal actuator of the type including a body member having a pressure chamber therein, a thermally expansible material in the pressure chamber, an output member operable by the expansible material, an electric resistance heater in the chamber in heat transfer relationship with the expansible material, and an opening in the body member for an electrical conductor for the heater, the improvement comprising: a first circular knife-edge surface on the body member and surrounding the end of the opening therein; a generally flat electrically insulative terminal-carrying member having two generally parallel surfaces; an electrically conductive terminal member extending through said terminal-carrying member transversely to said parallel surfaces and sealed with respect to said terminal-carrying member, said terminal-carrying member overlying said first knife-edge surface and having one of said parallel surfaces engaging said first knife-edge surface; means electrically connecting the inner end of said terminal member to the heater; a clamping member having a second circular knife-edge surface with a diameter smaller than the diameter of said first knife-edge surface, said clamping member being positioned so that said second knife-edge surface is co-axial with said first knife-edge surface and engages the parallel surface of said terminal-carrying member opposite the surface which engages said first knife-edge surface; and means forcing said clamping member into engagement with said terminal-carrying member so that the terminal-carrying member is pre-stressed, due to the difference in diameters of said knife-edge surfaces, oppositely to the stresses created therein by the expansion of the expansible material when heated.

4. A heat motor comprising: a body member having a pressure chamber therein and an opening extending from the exterior of said body member into the pressure chamber; a thermally expansible material substantially filling the pressure chamber; a force transmitting and sealing member having a relatively thin, radially deformable, annular wall portion and a base portion closing said member at one end thereof, said member being connected to said body member only by being tightly fitted in said opening in sliding engagement with the walls of said body member surrounding said opening and with the wall portion extending toward the pressure chamber and the hollow portion thereof substantially filled with said thermally expansible material, said member being movable a predetermined distance defining its stroke in said opening by said expansible material upon thermal expansion thereof, said member having an axial length at least as great as its stroke in said opening; and means yieldably urging said cup-shaped member toward said pressure chamber.

5. A heat motor comprising: a body member having a pressure chamber therein and first and second openings extending from the exterior of said body member into the pressure chamber; a thermally expansible material substantially filled with said thermally expansible material, sistance heater in said chamber in heat transfer relationship with said expansible material; a cup-shaped force transmitting and sealing member having a relatively thin, radially deformable annular wall portion and a base portion closing said member at one end thereof, said member being tightly fitted in one of said openings with the wall portion extending toward the pressure chamber and the hollow portion of the cup-shaped member substantially filled with said thermally expansible material, said cup-shaped member being movable in said opening by said expansible material upon thermal expansion thereof, said member having an axial length at least as great as its stroke in said first opening; means yieldably urging said cup-shaped member toward said pressure chamber; a first circular knife-edge surface on the body member surrounding said second opening therein; a relatively thin electrically insulative terminal-carrying member having two generally parallel surfaces; at least one electrically conductive terminal member extending through said terminal-carrying member transversely to said parallel surfaces and sealed with respect to said terminal-carrying member, said terminal-carrying member overlying said first knife-edge surface and having one of said parallel surfaces engaging said first knife-edge surface; means electrically connecting the inner end of said terminal member to said heater; a clamping member having a second circular knife-edge surface with a diameter smaller than the diameter of said first knife-edge surface, said clamping member being positioned so that said second knife-edge surface is co-axial with said first knife-edge surface and engages the other of said parallel surfaces of said terminal-carrying member opposite the surface which engages said first knife-edge surface; and means forcing said clamping member into engagement with said terminal-carrying member so that the terminal-carrying member is pre-stressed, due to the difference in diameters of said knife-edge surfaces, oppositely to the stresses created therein by the expansion of the expansible material when heated.

6. A heat motor comprising: a body member having a pressure chamber therein and an opening extending from the exterior of said body member into the pressure chamber; a thermally expansible material substantially filling the pressure chamber; a cup-shaped force transmitting and sealing member formed of a material capable of withstanding relatively high temperatures and pressures and having a relatively thin, radially deformable, annular wall portion and a base portion closing one end thereof, said member being connected to said body member only by being tightly fitted in said opening in sliding engagement with walls of said body member surrounding said opening and with the annular wall portion extending toward the pressure chamber and with the hollow portion surrounded thereby substantially filled with said thermally expansible material, said cup-shaped member being axially movable in said opening by said expansible material upon thermal expansion thereof, said member having an axial length at least as great as its stroke in said opening; an output shaft which is smaller in cross-section than said opening movably mounted in said opening and abutting the base portion of said cup-shaped member; axially spaced bearing means intermediate said output shaft and the walls of said opening; and means yieldably urging said output shaft and thereby said cup-shaped member toward said pressure chamber.

7. A heat motor comprising: a body member having a pressure chamber therein and first and second generally cylindrical openings extending from the exterior of said body member into the pressure chamber; a thermally expansible material substantially filling the pressure chamber; an electric resistance heater in said chamber in heat transfer relationship with said expansible material; a cup-shaped force transmitting and sealing member formed of a plastic material capable of withstanding relatively high temperatures and pressures, said cup-shaped member having a relatively thin, radially deformable, annular wall portion and a base portion, said member being tightly fitted in a first of said openings with the annular wall portion extending toward the pressure chamber and with the hollow portion of the cup-shaped member substantially filled with said thermally expansible material, said cup-shaped member being movable in said first opening by said expansible material upon thermal expansion thereof, said member having an axial length at least as great as its stroke in said first opening; a cylindrical output shaft mounted in said first opening and with a diameter substantially smaller than the diameter of said first opening; bearing means intermediate said output shaft and the walls of said first opening and maintaining said output shaft in spaced annular relationship with the walls of said opening; means yieldably urging said output shaft and thereby said cup-shaped member toward said pressure chamber; a first circular knife-edge surface on the body member surrounding and generally co-axial with said second opening therein; a relatively thin electrically insulative terminal-carrying disk having two generally parallel surfaces; at least one electrically conductive terminal member extending through said terminal-carrying disk transversely to said parallel surfaces and sealed with respect to said terminal-carrying disk, said terminal-carrying disk overlying said first knife-edge surface and having one of said parallel surfaces engaging said first knife-edge surface; means electrically connecting the inner end of said terminal member to said heater; a clamping member having a second circular knife-edge surface with a diameter smaller than the diameter of said first knife-edge surface, said clamping member being positioned so that said second knife-edge surface is co-axial with said first knife-edge surface and engages the other of said parallel surfaces of said terminal-carrying member opposite the surface which engages said first knife-edge surface; and a threaded surface on said clamping member and a mating threaded surface on said body member into which said clamping member is threaded and forcibly engages said terminal-carrying member so that the terminal-carrying member is pre-stressed, due to the difference in diameters of said knife-edge surfaces, oppositely to the stresses created therein by the expansion of the expansible material when heated.

8. In a device having a body member with a pressure chamber therein, a flowable material in the chamber, an opening in the body member extending from the exterior thereof into the chamber, and a closure member for the opening, the improved sealing arrangement comprising: a pair of surfaces on said body member intersecting at a first angle and forming a first circular knife-edge around the opening in the body member; the closure member being formed with two generally parallel surfaces and being relatively thin in the direction perpendicular to said parallel surfaces, the closure member having formed in one of said parallel surfaces an annular V-shaped groove having a diameter substantially equal to that of said first knife-edge surface and with the sides of said V-shaped groove intersecting at an angle which is smaller than said first angle, said closure member being mounted on the body member with said first knife-edge extending into said V-shaped groove; a clamping member having a second circular knife edge with a diameter smaller than that of said first knife-edge and engaging the other of said parallel surfaces on the closure member; and mating threaded portions on the body member and on said clamping member so arranged that when the members are threaded together said second knife-edge is generally co-axial with said first knife-edge, said clamping member being tightened against the closure member so that said first knife-edge is forced into said V-shaped groove and said closure member is bowed, and hence pre-stressed, toward the pressure chamber due to the difference in the diameters of said first and second knife-edge surfaces.

9. A heat motor comprising: a body member having a pressure chamber therein and an opening extending from the exterior of said body member into the pressure chamber; a thermally expansible material substantially filling the pressure chamber; an electrically energizable heater element mounted in heat transfer relation with said expansible material; a cup-shaped force transmitting and sealing member formed of a plastic material capable of withstanding relatively high temperatures and pressures, said member having a relatively thin, radially deformable, annular wall portion and a base portion closing one end thereof, said member being connected to said body member only by being tightly fitted in said opening slidably engaging said body member surrounding said opening, and with the annular wall portion extending toward the pressure chamber and with the hollow portion thereof substantially filled with said thermally expansible material, said cup-shaped member being axially movable in said opening by said expansible material upon thermal expansion thereof, said member having an axial length at least as great as its stroke in said opening; an output shaft which is smaller in cross-section than said opening movably mounted in said opening and abutting the base portion of said cup-shaped member; bearing means intermediate said output shaft and the walls of said opening; means yieldably urging said output shaft and thereby said cup-shaped member toward said pressure chamber; and means limiting the movement of said output shaft and said cup-shaped member outwardly from said pressure chamber and thereby defining the maximum stroke of said members.

10. A heat motor comprising: a body member having a pressure chamber therein and an opening extending from the exterior of said body member into the pressure chamber; a thermally expansible material substantially filling the pressure chamber; an electrically energizable heater element mounted in heat transfer relation with said expansible material; a cup-shaped force transmitting and sealing member formed of a plastic material capable of withstanding relatively high temperatures and pressures, said member having a relatively thin, radially deformable annular wall portion and a base portion closing one end thereof, said member being connected to said body member only by being tightly fitted in said opening, slidably engaging said body member surrounding said opening, and with the annular wall portion extending toward the pressure chamber and with the hollow portion surrounded thereby substantially filled with said thermally expansible material, said cup-shaped member being axially movable in said opening by said expansible material upon thermal expansion thereof, said member having an axial length at least as great as its stroke in said opening; an output shaft, which is smaller in cross-section than said opening, movably mounted in said opening and abutting the base portion of said cup-shaped member; bearing means intermediate said output shaft and the walls of said opening; means yieldably urging said output shaft and thereby said cup-shaped member toward said pressure chamber; and switch means connected in controlling relation with said heater and operable in response to movement of said output shaft to a predetermined position to de-energize said heater and thereby limit the movement of said output shaft and said cup-shaped member outwardly from the pressure chamber to a position defining the maximum stroke of said members.

11. A heat motor comprising: a body member having a pressure chamber therein and an opening extending from the exterior of said body member into the pressure chamber; a thermally expansible material substantially filling the pressure chamber; a cup-shaped force transmitting and sealing member formed of a material capable of withstanding relatively high temperatures and pressures, the last named member having a relatively thin, radially deformable, annular wall portion and a base portion closing one end thereof, said member being connected to said body member only by being tightly fitted in said opening, slidably engaging said body member surrounding said opening, and with the annular wall portion extending toward the pressure chamber and with the hollow portion in said member substantially filled with said thermally expansible material, said cup-shaped member being axially movable in said opening by said expansible material upon thermal expansion thereof, said member further being characterized in that it has an axial length at least as great as its stroke in said opening; an output shaft which is smaller in cross-section than said opening, said shaft being movably mounted in said opening and abutting the base portion of said cup-shaped member; and a plurality of axially spaced bearing sleeves intermediate said output shaft and the walls of said opening and maintaining said output shaft generally co-axial with said elongated opening and spaced from the walls thereof, said bearing members being constructed of a material which is relatively non-extrudable, wear resistant, and having a relatively high degree of lubricity.

12. The heat motor of claim 11 wherein said cup-shaped member is formed of polytetrafluoroethylene and said bearing members are formed from a glass-filled composition of the same.

References Cited by the Examiner

UNITED STATES PATENTS

| | | | |
|---|---|---|---|
| 2,781,784 | 2/1957 | Baker | 60—23 X |
| 3,166,892 | 1/1965 | Sherwood | 60—23 |
| 3,213,606 | 10/1965 | Martin et al. | 60—23 |

EDGAR W. GEOGHEGAN, *Primary Examiner.*